Jan. 6, 1970 HSU CHANG ET AL 3,488,167

MAGNETIC MEMORY ELEMENT WITH VARIABLE EXCHANGE COUPLING

Filed July 6, 1967 2 Sheets-Sheet 1

INVENTORS
HSU CHANG
DAVID A. THOMPSON

BY [signature]

ATTORNEY

United States Patent Office 3,488,167
Patented Jan. 6, 1970

3,488,167

MAGNETIC MEMORY ELEMENT WITH VARIABLE EXCHANGE COUPLING

Hsu Chang, Yorktown Heights, N.Y., and David A. Thompson, Pittsburgh, Pa., assignors to International Business Machines Corporation, Armonk, N.Y., a corporation of New York Filed July 6, 1967, Ser. No. 651,539
Int. Cl. G11b 5/66; C22c 39/38
U.S. Cl. 29—196.1 9 Claims

ABSTRACT OF THE DISCLOSURE

A nondestructive read-out memory cell is provided employing three superposed layers of anisotropic magnetic material. In one stable state of the cell, its three layers are exchange-coupled to each other. The Curie temperature of the middle layer is lower than that of the outer layers; the Curie temperature of a ferromagnetic material is defined as the highest temperature at which uniformly oriented magnetic domains can exist in such a material in the absence of an applied magnetic field.

By locally heating (for example, using a laser beam) the cell to a temperature just above the Curie temperature of the central layer, the ferromagnetism of the central layer is destroyed and the exchange coupling between the two outer layers is thereby destroyed. The respective properties of the layers are so chosen that, in the absence of exchange coupling, the stray magnetic field of the lowest layer dominates the magnetization of the top layer, causing the magnetic vector of the latter to become reversed and assume a position anti-parallel to the magnetic vector of the lowest layer. The reversal of magnetization can be detected inductively by a suitable output winding or by magneto-optic means. When the laser beam has been turned off, the entire cell cools down sufficiently to reinstate the exchange-coupled relationship, causing the top layer to return to its initial state prior to readout. Many such cells can be grouped to form a matrix of cells to produce a magnetic memory that can be read out nondestructively.

BACKGROUND OF THE INVENTION

It has been found (see "Journal of Applied Physics," September, 1965, vol. 36, pp. 2951+, by E. Goto et al.) that a memory element composed of two ferromagnetic layers may have properties which are superior to single layer films for certain memory applications. In such a plural layer memory element, ferromagnetic exchange interaction takes place between the layers, tending to align the magnetic spins of neighboring atoms. Those states are favored in which magnetization of the two layers are parallel. The coupling increases as the films are made thinner or as the exchange constants of the materials are increased.

Other workers in the thin film magnetic storage field have proposed a three layer structure comprising two magnetic layers separated by a nonmagnetic layer. See O. Massenet et al., International Conference on Magnetics, Stuttgart, Germany, April, 1966, Paper 14.1. Because of pinholes in the very thin nonmagnetic layer, a weak exchange coupling exists between the two magnetic layers. Such workers have prepared a memory element comprising a "reading" layer having a weak anisotropy field separated by a nonmagnetic metal layer from a "memory" layer with a higher anisotropy field. Information is recorded by magnetizing the "memory" layer in a given direction and the "reading" layer becomes magnetized in the same direction. For interrogation, a magnetic field pulse is applied in the hard direction and turns the "reading" layer magnetization perpendicular to the easy direction of magnetization whilst the "memory" layer magnetization is turned through considerably less than 90°. A readout signal on an appropriate output winding is attained at this time. At the end of the interrogation pulse, the "memory" layer magnetization returns spontaneously to its original position, bringing with it the "reading" layer magnetization in that the "reading" layer is exchange-coupled to the "memory" layer. A nondestructive memory element is thus obtained. An advantage of this prior art three layer structure is that the exchange coupling between the two ferromagnetic layers can be weakened, and thereby allow more independent rotations of the two magnetizations. A disadvantage of the structure is that the pin holes in the middle layer are not easily controlled during fabrication.

The present invention is similar to the three layered memory described above in having two magnetic elements of different anisotropies separated by a third element. However, the presently noval three layered device employs a magnetic rather than a nonmagnetic middle layer. The magnetic layer allows the two outer layers to be directly exchange-coupled to each other and aids in maintaining the magnetically stored information in a highly stable state. Moreover, the proposed novel nondestructive readout device is particularly compatible with beam addressable memories in that a laser beam can supply the heating energy to raise the temperature of the middle magnetic layer and destroy the exchange coupling between the outer layers, such destruction being required for readout purposes. In summary, for nondestructive readout, (1) the "read" layer and the "storage" layer should be strongly coupled and (2) to permit large signals from the "read" layer while only slightly disturbing the "storage" layer, the two layers should be weakly coupled *during read.* The present invention uniquely meets the two requirements, while in the above noted Goto reference or in Massenet's structure, only one of the two requirements is met.

Thus it is an object of this invention to provide a novel nondestructive thin film memory device.

It is yet another object to provide a nondestructive thin film memory device employing exchange-coupled magnetic films.

It is yet another object to provide an exchange-coupled trilayer magnetic memory element wherein the central layer has a lower Curie temperature than the top and bottom layer.

The foregoing and other objects, features and advantages of the invention will be apparent from the following more particular description of the preferred embodiment of the invention, as illustrated in the accompanying drawings.

Description of the preferred embodiment

Figure 1:
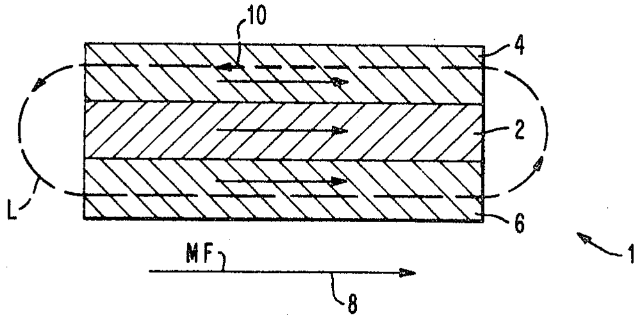
FIG. 1 is a schematic view of the novel memory element of the present invention.

The basic magnetic memory element 1 shown in FIG. 1 consists of three layers 2, 4 and 6 of magnetic material. The materials for layers 2, 4 and 6 are chosen so that the Curie temperature of layer 2 is considerably less than the Curie temperature of both layer 4 and layer 6. The materials for such layers are also chosen so that one layer, for example, bottom layer 6, has a larger anisotropy than layer 4. Because of exchange coupling, the magnetization of layer 6, when magnetized by an externally applied magnetic field MF, will induce a field in layers 2 and 4 in the direction of the field MF as represented by the arrow 8. When the magnetic field MF is removed, a stable magnetic remanent state of magnetization exists in the multiple-layered configuration of FIG. 1.

The stable state of FIG. 1 exists because the magnetic layer 2 provides the exchange coupling between layer 6 and layer 4 and causes the magnetic spins in layer 4 to follow the magnetic spins of layer 2. If the magnetostatic coupling between layer 4 and layer 6 were stronger than the exchange coupling, then the layers 4 and 6 would be in the path of a closed magnetic loop L and the field in layer 4 would then follow the path of dotted arrow 10. However, in all combinations of thicknesses and materials used for layers 2, 4 and 6 during the quiescent state of the memory device (no heating of the device), the parameters are always chosen so that the exchange coupling produced by magnetic film 2 between magnetic layers 6 and 4 exceeds the magnetostatic coupling between layers 4 and 6.

The multiple thin film memory is manufactured by vacuum evaporation in the presence of a magnetic field onto a heated glass substrate, not shown. It may also be produced by electroplating, sputtering, or any other suitable manufacturing technique. The first layer 6 that is deposited is, for example, a Permalloy type alloy comprising ~81% nickel and ~19% iron, could have a thickness of 200 A. to 10,000 A., and possesses uniaxial anisotropy. The central layer or film 2 is deposited onto layer 6 and will have a thickness range of the same order as layer 6, namely, about 200 A. to 10,000 A. Such central layer 2 is magnetic but must have a Curie temperature less than that of the Permalloy layer 6. Layer 2 is composed of 81% nickel and 19% iron, but chromium is added to the Permalloy to the extent that layer 2 consists of 90% Permalloy and 10% chromium. The layer 2 maintains its magnetic properties and reduced Curie temperature if molybdenum or copper is used instead of chromium. After the depositions of layers 6 and 2 have been completed, layer 4 is deposited as a 200 A.–10,000 A. thick film of Permalloy, but by changing the composition, or angle of incidence during deposition, or deposition temperature, layer 4 may have a uniaxial anistropy that is much less than the uniaxial anistropy of layer 6.

No matter what method is employed in the manufacture of the multiple-layered film, one has to insure that the deposition of subsequent layers do not alter the magnetic properties of the previous layers.

Figure 3:
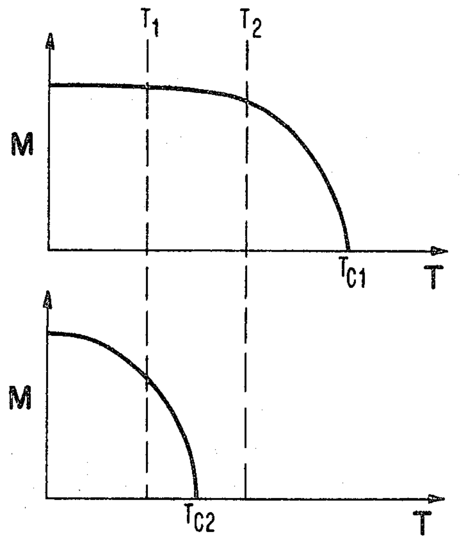
FIG. 3 is a plot of magnetic moment versus temperature for an outer layer and the middle layer of the memory.
Figure 4:
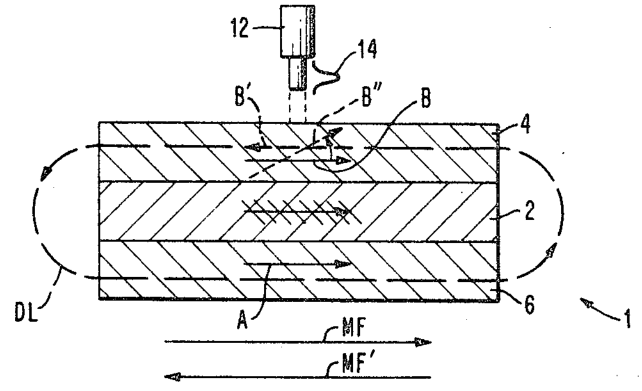
FIG. 4 is a representation of the manner in which nondestructive readout is obtained with the novel memory element.

The operation of the basic memory element shown in FIG. 1 can be understood with the help of FIGS. 3 and 4. Binary information is stored in layer 6 by applying a magnetic field MF that exceeds the coercive force of magnetic layer 6. When such magnetic field MF is terminated, the remanent magnetization in film 6 is in the direction of arrow A. Because of the exchange coupling introduced by magnetic layer 2, layers 2 and 4 become magnetized in the direction of arrow A. The exchange coupling force or field effect exceeds the magnetostatic effect shown in dotted lines DL. If the magnetostatic effect were greater than the exchange coupling, then the stored field represented by the dotted line DL would cause the field in film 4 represented by arrow B to reverse itself and be oriented as shown by dotted arrow B′. Only when the memory bit is of a finite dimension will it have a magnetostatic field. For example, an infinitely long bar magnet does not exert any magnetostatic field in its central portion. The finite dimension or discreteness of a bit is achievable either by local heating or by mechanical definition, i.e., by etching.

When it is desired to interrogate the binary information stored in the multilayered film, a laser source 12 is pulsed and emits a very short pulse 14 of energy which impinges on a very small spot on the surface of layer 4. Such pulse of energy has been selected so that it raises the temperature of the multiple film from a temperature $T_1$ to $T_2$, the latter being less than the Curie temperature $Tc_1$, of either film 4 or 6 but greater than the Curie temperature $Tc_2$ of intermediate layer 2. Once the Curie temperature $Tc_2$ of layer 2 is reached, its spontaneous magnetism disappears and the exchange coupling between layer 6 and layer 4 also disappears. As a consequence of the destruction of such exchange coupling, the magnetostatic effect of the stored magnetization field A prevails over the now destroyed exchange coupling effect and magnetization vector B rotates in the direction shown by dotted arrow B″ in FIG. 4. During the rotation of such magnetization vector B, voltage signals are induced in a sense winding (not shown) that is inductively coupled to said rotating magnetic field. Such voltage signals are sent to a suitable conventional detecting device for indicating the readout of a "1." Of course, the rotation of magnetization can also be detected by the Kerr magneto-optic effect, if desired.

When the laser pulse 14 terminates, the central layer 2 cools to below its Curie temperature $Tc_2$ whereby the exchange coupling returns and the stored field, represented by arrow A, causes the magnetization vector in layer 4 and layer 2 to be oriented in the same direction as the magnetization vector in layer 6. In effect, the memory element 1 shown in FIG. 1 consists of a "reading" layer 4 with a weak anisotropy field separated from a "memory" layer 6 having a higher anisotropy field by a magnetic layer 2. After the binary information is recorded in layer 6, the exchange coupling causes all dipoles in film 2 and 4 to be lined up in the direction of field A. When the laser source 12 is turned on, a spot of energy from pulse 14 dwells on the surface 4 of memory element 1, destroying the exchange coupling between layers 4 and 6 but not the magnetism of either layer 4 or layer 6. Such destruction of exchange coupling turns the "reading" layer 4 magnetism towards a direction perpendicular to the easy direction (A) of magnetization, but the "memory" layer 6 magnetization is not modified. At the end of the laser pulse, exchange coupling returns and the "reading" layer 4 magnetization returns spontaneously to its original direction B, being brought to that position by the presence of the "memory" field A.

There may be many modes of operation. One mode of operation is to have a constant bias field in the hard direction. When the three layers are strongly exchange coupled, layer 4 then has a small component in the hard direction. When exchange coupling between layers 4 and 6 is destroyed, layer 4 has a large magnetization component in the hard direction. A second mode of operation is without the hard direction field. The destruction of exchange coupling then forces magnetization of layer 4 to be anti-parallel to that of layer 6. The memory bit must be of finite size in order to have the forcing magnetostatic field. The first mode is a rotation process and the second one is a wall motion process.

It is understood that the memory element 1 could be made to store a "0" by applying a magnetic field MF′ that overrides the remanent field A. The magnet field in the "reading" layer 4 would then be opposite to that which existed when a "1" was stored in the "memory" layer 6.

Figure 5:
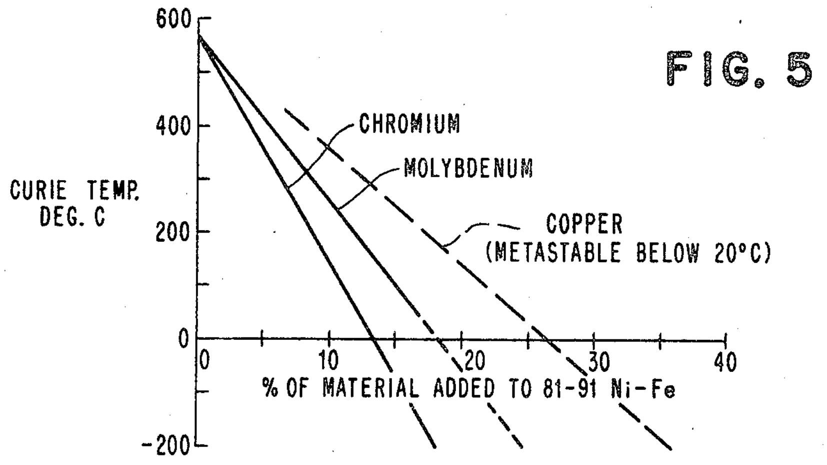
FIG. 5 is a plot of Curie temperature versus concentration of various metals compounded with Permalloy.

FIG. 5 is a plot of the Curie temperature of Permalloy as a function of alloying with other elements. For example, if one has a composition of 87% Permalloy and 13% chromium, the Curie temperature of the composition is about 50° C. For the same Curie temperature, the composition that includes molybdenum would be 83% Permalloy and 17% molybdenum. If copper is used instead of chromium or molybdenum, then 75% Permalloy and 25% copper are used. Plots similar to FIG. 5 are used for different compositions that compose the middle layer 2 of the novel memory element 1. One tries to obtain a magnetic material for layer 2 whose Curie temperature is much less than the Curie temperature for layers 4 and 6. It should also be of advantage to have the Curie temperature of layer 2 to be close to room temperature; then the entire device can be operated at room temperature.

Another material that could be used for layer 2 would be gadolinium. The latter is not only ferromagnetic but has a Curie temperature of 25° C., allowing for use at room temperature. Since gadolinium has a Curie temperature of 300° K. and Permalloy has a Curie temperature of 500° K., the two materials are compatible for room temperature operation.

In the description of the present invention, no effort has been made to discuss the theories of domain and wall switching of thin magnetic films. A treatise on such subject is entitled "Thin Ferromagnetic Films" by M. Prutton, published 1964—Butterworth, London, England.

Figure 2:
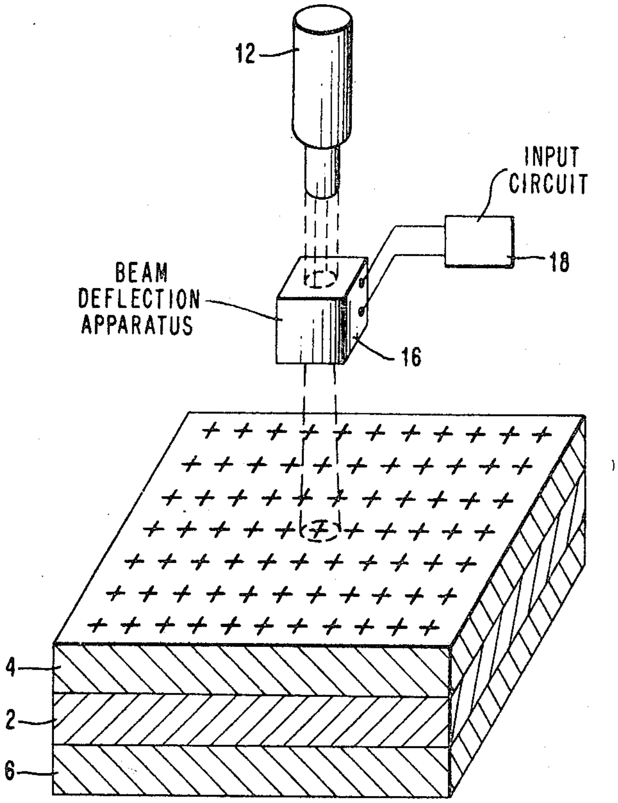
FIG. 2 is a view of a memory matrix composed of the novel memory element of FIG. 1.

Methods for employing a laster beam to address a magnetic spot storing binary information are set out in U.S. Patent 3,164,816 to Chang et al., which issued Jan. 5, 1965. Such schemes for addressing and interrogating binary bits as Chang et al, suggests are compatible with the novel memory element of this invention. Where the readout scheme involves the use of a sense conductor that is inductively coupled to the memory element 1 so as to sense the changing direction of magnetic field B, then a readout scheme similar to that shown in U.S. Patent 3,154,768 to Hardwick, which issued Oct. 27, 1964, can be used with this invention. In FIG. 2, the pulse from laser source 12 would be made to dwell on any individual memory spot by conventional circuitry, shown schematically as a deflecting apparatus 16 and an input circuit 18.

It is to be understood that many alloys can be used for the central layer 2 of the memory element 1 other than those disclosed herein. In choosing the material that will provide the exchange coupling between layers 4 and 6, the material selected should have the following properties:

(1) It should have a reasonably high Curie temperature, even though the latter is considerably less than the Curie temperature of layers 4 and 6. One can always bias the memory element 1 close to the Curie temperature of the material selected for layer 2 so that relatively little energy is needed to reach its Curie temperature. It would also be desirable to choose materials that have Curie temperatures close to room temperature.

(2) The material should be isotropic and have low crystalline anisotropy. Since the energy involved in reversing the magnetization of film 2 is 4 M*Hcd*, where M is the strength of the stored magnetic field, H*c* is the switching field and *d* is the thickness of the film, it is desirable to have a material which has simultaneously a low M and a low H*c*.

A novel memory element has been described which allows for nondestructive readout of information stored in magnetic thin films. The memory element is compatible for readout either in memory systems employing beams of energy for addressing and sensing the information stored in the memory element or for memory systems where sense lines are inductively coupled to the changing magnetic field associated with a switching memory element being addressed and sensed. Where desired, the local heating of a memory spot can be caused by an electron beam, a mechanical probe, a resistive element, or any other means for effecting the raising of the temperature of layer 2 to its Curie temperature. It is the memory element that is novel and not the method or means for heating it.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic storage element comprising three layers of ferromagnetic material, the central layer having a Curie temperature that is less than the Curie temperature of the other two adjacent layers.

2. A magnetic storage element comprising three layers of ferromagnetic material, the central layer having a Curie temperature that is less than the other two adjacent layers, and one of said adjacent layers having a higher anisotropy field than the other layer.

3. The magnetic storage element of claim 1 wherein each of such layers is a thin film of the order of 200 angstroms to 10,000 angstroms.

4. The magnetic storage element of claim 2 wherein each of such layers is a thin film of the order of 200 angstroms to 10,000 angstroms.

5. A magnetic storage element comprising three layers of ferromagnetic material, the central layer having a Curie temperature that is less than the Curie temperature of the two adjacent layers, and one of said adjacent layers having a higher anisotropy field than the other layer, said adjacent layers composed of a Permalloy alloy of 81% iron and 19% nickel and said central layer comprising an alloy of approximately 90% Permalloy and approximately 10% chromium.

6. A magnetic storage element comprising three layers of ferromagnetic material, the central layer having a Curie temperature that is less than the Curie temperature of the two adjacent layers, and one of said adjacent layers having a higher anisotropy field than the other layer, said adjacent layers composed of a Permalloy alloy of 81% iron and 19% nickel and said central layer comprising an alloy of approximately 90% Permalloy and approximately 10% molybdenum.

7. A magnetic storage element comprising three layers of ferromagnetic material, the central layer having a Curie temperature that is less than the Curie temperature of the two adjacent layers, and one of said adjacent layers having a higher anisotropy field than the other layer, said adjacent layers composed of a Permalloy alloy of 81% iron and 19% nickel and said central layer comprising an alloy of approximately 90% Permalloy and approximately 10% of copper.

8. A magnetic storage element comprising three layers of ferromagnetic material, the central layer having a Curie temperature that is less than the Curie temperature of the two adjacent layers and wherein one of said adjacent layers has a higher anisotropy field than the other layer, said adjacent layers composed of a Permalloy alloy of 81% iron and 19% nickel and said central layer consisting of gadolinium.

9. A magnetic storage element comprising three layers of ferromagnetic material, the central layer having a Curie temperature that is less than the Curie temperature of the other two layers, one of said adjacent layers having a higher anisotropy field than the other adjacent layers, means for providing energy to said element to cause only the central layer to reach its Curie temperature so as to destroy any exchange coupling existing between said adjacent layers.

References Cited

UNITED STATES PATENTS

| | | | |
|---|---|---|---|
| 3,414,891 | 12/1968 | Kohn | 340—174 |
| 3,422,407 | 1/1969 | Gould et al. | 340—174 |

L. DEWAYNE RUTLEDGE, Primary Examiner

E. L. WEISE, Assistant Examiner

U.S. Cl. X.R.

29—196.6; 340—174